(12) United States Patent
Ejiri et al.

(10) Patent No.: US 6,482,506 B1
(45) Date of Patent: Nov. 19, 2002

(54) MAGNETIC RECORDING MEDIUM

(75) Inventors: Kiyomi Ejiri, Kanagawa (JP); Masahiko Mori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 184 days.

(21) Appl. No.: 09/648,823

(22) Filed: Aug. 25, 2000

(30) Foreign Application Priority Data

Aug. 26, 1999 (JP) ............................................. 11-240303

(51) Int. Cl.$^7$ ................................................ G11B 5/716
(52) U.S. Cl. ........................ 428/212; 428/216; 428/323; 428/328; 428/329; 428/694 BM; 428/694 BS; 428/900
(58) Field of Search ................................ 428/212, 323, 428/216, 328, 329, 694 BM, 694 BS, 900

(56) References Cited

U.S. PATENT DOCUMENTS

| | | | |
|---|---|---|---|
| 5,156,908 A | * 10/1992 | Araki et al. | ................. 428/323 |
| 5,405,679 A | * 4/1995 | Isobe | ......................... 428/212 |
| 5,447,782 A | 9/1995 | Inaba et al. | .................. 428/212 |
| 5,798,176 A | * 8/1998 | Kitaori et al. | .............. 428/402 |

* cited by examiner

*Primary Examiner*—Stevan A. Resan
(74) *Attorney, Agent, or Firm*—Stroock & Stroock & Lavan LLP

(57) ABSTRACT

Provided is a particulate magnetic recording medium having excellent electromagnetic characteristics, especially, a particulate magnetic recording medium which achieves a high output and a low noise and which is suitable for reproduction with an MR head.

A magnetic recording medium comprising a flexible nonmagnetic support having thereon, in order, a nonmagnetic layer containing a nonmagnetic powder and a binder and at least two magnetic layers including an uppermost magnetic layer and a lowermost magnetic layer, each containing a ferromagnetic powder and a binder, wherein said at least two magnetic layers have a total thickness of from 0.02 μm to 0.5 μm and an average particle volume V(u) and a saturation magnetization σs(u) of a ferromagnetic powder in said uppermost magnetic layer are, respectively, higher than an average particle volume V(L) and a saturation magnetization σs(L) of a ferromagnetic powder in said lowermost magnetic layer.

16 Claims, No Drawings

MAGNETIC RECORDING MEDIUM

BACKGROUND OF THE INVENTION

1. Field of the Invention

This invention relates to a magnetic recording medium, especially, a magnetic recording medium comprising two or more magnetic layers and a nonmagnetic layer which are capable of high-density recording.

2. Description of Related Art

Conventionally, as a magnetic recording medium such as a video tape, an audio tape and a magnetic disc, a nonmagnetic support coated with a magnetic layer in which a ferromagnetic iron oxide, a Co-modified ferromagnetic iron oxide, $CrO_2$, a ferromagnetic alloy powder or the like are dispersed in a binder is widely used. Due to recent high densification of recording, a recording wavelength tends to become short. If a recording wavelength becomes short, in a relatively thick magnetic layer, problems such as a self-demagnetization loss during recording and a thickness loss during reproducing appear significant, thereby lowering the output level. Therefore, magnetic recording media comprising a thinner magnetic layer are being developed. However, if a magnetic layer is made thinner to have a thickness equal to or less than 2 $\mu$m, the influence of a nonmagnetic support may easily appear on the surface of the magnetic layer, and a deteriorating tendency in electromagnetic characteristics and dropouts are seen.

To solve such problems, there has been proposed a method for forming a thin thickness magnetic layer and a nonmagnetic layer under the magnetic layer, on a nonmagnetic support, by using a simultaneous multilayer coating technique as well as a concentrated coating liquid for the magnetic layer as disclosed in Japanese Unexamined Patent Publication (KOKAI) Showa No.63-191315 and U.S. Pat. No. 4,863,793. By utilizing these techniques, a magnetic recording medium having improved electromagnetic characteristics could be obtainable and production yields were remarkably improved. However, in order to satisfy the recent demands for further high-density recording, development of a magnetic recording medium capable of further high-density recording is desired.

Specifically, investigations for improving a track density by using a high-sensitive magnetoresistive head (MR head) have been done with respect to a flexible medium. In this case, the medium is required to exhibit further high-densification and a lower noise. As an example of the means for obtaining a high-density medium, use of magnetic particles having a large magnetization is known. However, if a sufficient magnetization amount is tried to secure using magnetic particles presently available, a particle volume becomes large, thereby, disadvantageously, a magnetic recording medium having an expected high output cannot be obtained. In addition, in order to lower a noise, it is preferable to lower a volume of magnetic particles. However, reduction of the magnetic particles volume results in lowering a magnetization amount and an output.

SUMMARY OF THE INVENTION

Therefore, it is an object of the present invention to provide a particulate magnetic recording medium having excellent electromagnetic characteristics, especially, a particulate magnetic recording medium which achieves a high output and a low noise and which is suitable for reproduction with an MR head.

The present inventors have diligently studied for characteristics of a magnetic material used for each magnetic layer and a thickness construction of a magnetic recording medium comprising multiple magnetic layers on a lower nonmagnetic layer mainly containing a nonmagnetic powder and a binder, which is formed on a flexible nonmagnetic support. As a result, it was found that such a magnetic recording medium can solve the above-mentioned problems as characterized in that a sum of a thickness d(L) of a lower magnetic layer approximate to a lower nonmagnetic layer (hereinafter referred to as a lowermost magnetic layer) and a thickness d(u) of an upper magnetic layer on a surface side (hereinafter referred to as an uppermost magnetic layer) is in the range of from 0.02 $\mu$m to 0.5 $\mu$m, and an average particle volume V(u) and a saturation magnetization $\sigma$s(u) of magnetic particles contained in the uppermost magnetic layer are, respectively, larger than a volume V(L) and saturation magnetization $\sigma$s(L) of magnetic particles contained in the lowermost magnetic layer, thereby the present invention was accomplished.

It is to be noted that a medium comprising multiple magnetic layers on a nonmagnetic layer, in which a size of magnetic particles contained in an uppermost magnetic layer is smaller than a size of magnetic particles contained in a lowermost nonmagnetic layer has been known (see U.S. Pat. No. 5,447,782). However, the medium of the present invention is different from the invention disclosed therein. That is, although the above-mentioned invention is a medium suitable for accomplishing a high output and a low noise in a case a low-sensitive inductive head was used, a noise was not necessarily lowered when this medium was reproduced with an MR head. It can be considered that this is because particles having a large volume are located at a deep part of the magnetic layer, and an influence of a noise of the deep part becomes large in using a high-sensitive MR head while a magnetic noise of a deep part can be ignored in a case a conventional inductive head was used.

In the magnetic recording medium of the present invention, it is further effective that a d(u):d(L) is in the ratio of from 2:8 to 8:2, preferably from 3:7 to 7:3, further preferably from 3:7 to 6:4 from the viewpoint that a high output is compatible with a low noise. A preferable ratio depends on a recording wavelength of a recorded signal and an uppermost magnetic layer can be preferably thinner as the wavelength is shorter.

In addition, in the magnetic recording medium of the present invention, it is further effective that each coercive force Hc of an uppermost magnetic layer and a lowermost magnetic layer is equal to or higher than 2000 Oe from the viewpoint of improving an output in the recording with a short wavelength.

As for a magnetic material contained in the magnetic layer, it is preferable that an acicular alloy magnetic powder containing Fe as a main component is used in the uppermost magnetic layer and an acicular magnetic powder containing Fe as a main component or a magnetoplumbite hexagonal ferrite is used in the lowermost magnetic layer from the viewpoint that a high output can be compatible with a low noise.

Moreover, it is preferable that the total weight of a nonmagnetic material which is a solid at an ordinary temperature and contained in the uppermost magnetic layer is larger than the total weight of a nonmagnetic material which is a solid at an ordinary temperature and contained in the lowermost magnetic layer from the viewpoint that a filling density of the lowermost magnetic layer becomes higher and a noise becomes lower, at the same time, running durability is secured. It is to be noted that the nonmagnetic material which is a solid at an ordinary temperature is, for example, a binder containing a hardening agent, an abrasive, carbon black and the other solid lubricant.

MODE FOR CARRYING OUT OF THE INVENTION

A mechanism of the present invention will be explained hereinafter. The present invention is characterized by forming a thin magnetic layer which comprises two or more layers and has the total thickness equal to or less than 0.5 μm on a nonmagnetic lower layer. By the thin magnetic layer, a self-demagnetization loss is reduced, a reproduction output in high-density recording becomes higher and a resolution property is improved. A role of the nonmagnetic lower layer is the same as that of a conventional medium, such as coating a thin magnetic layer without coating loss and improving a surface smoothing effect by calendering.

The thin magnetic layer is divided into two or more layers, and then magnetic particles which have a high σs (but a large volume) and easily obtain an output are used in an uppermost magnetic layer on a surface side and magnetic particles which have a low noise (and a low σs) are incorporated into a lowermost magnetic layer.

While the reproduction output can be secured by controlling a sum of a magnetization amount of the uppermost magnetic layer and the lowermost magnetic layer, the noise of the deep part can be reduced as mentioned above. Therefore, as a result, a C/N ratio can be improved compared to the case in which each layer is used alone. In this layer construction, a filling density of the lowermost magnetic layer and a C/N ratio can be improved by reducing a nonmagnetic powder in the lowermost magnetic layer.

A preferable embodiment of a multilayer magnetic layer will be explained below.

Thicknesses of the uppermost magnetic layer and the lowermost magnetic layer are preferably as mentioned below.

First of all, the lower limit of the total thickness of the uppermost magnetic layer and the lowermost magnetic layer is 0.02 μm, preferably 0.03 μm, further preferably 0.04 μm and the upper limit of the total thickness is 0.5 μm, preferably 0.3 μm, further preferably 0.2 μm. If the total thickness of the uppermost magnetic layer and the lowermost magnetic layer is less than 0.02 μm, a magnetization amount is disadvantageously insufficient. In addition, if the total thickness of the uppermost magnetic layer and the lowermost magnetic layer exceeds 0.5 μm, a self-demagnetization loss problematically increased.

In addition, when the magnetic layer has a layer other than the uppermost and lowermost magnetic layers, a thickness of the layer other than the uppermost and lowermost magnetic layers is preferably from 0.1 μm to 3 μm, more preferably from 0.3 to 2.5 μm.

A thickness d(u) of the uppermost magnetic layer and a thickness d(L) of the lowermost magnetic layer preferably have the following relationship. A ratio of d(u):d(L) is from 2:8 to 8:2, preferably from 3:7 to 7:3, further preferably from 3:7 to 6:4. By the d(u):d(L) in the range of from 2:8 to 8:2, a high output can advantageously be compatible with a low noise. In addition, when the magnetic layer has a layer other than the uppermost and lowermost magnetic layers, the thicknesses of the uppermost magnetic layer, the lowermost magnetic layer and the other layer are adjusted so that the total sum of the above thicknesses is in the range equal to or less than 1 μm.

When a volume and a saturation magnetization of a ferromagnetic powder used in the uppermost magnetic layer and the lowermost magnetic layer are respectively referred to as V(u) and V(L) as well as σs(u) and σs(L), it is preferable that the V(u) is larger than the V(L) (V(u)>V(L)) and the σs(u) is larger than the σs(L) (σs(u)>σs(L)) from the viewpoint that a high output is compatible with a low noise.

In the present invention, a volume of a ferromagnetic powder is defined as a volume calculated from an average particle size investigated using a TEM. For example, it can be calculated as follows.

1) In the case of an acicular ferromagnetic powder: (Mean length of major axis)×π×(Mean length of minor axis/2)$^2$
2) In the case of a hexagonal ferrite: (Area of hexagonal calculated from mean plate diameter)×(Average thickness)

It is appropriate that the volume V(u) of the ferromagnetic powder is in the range of from 5,000 to 50,000 nm$^3$, the V(L) is in the range of from 1,000 to 20,000 nm$^3$ and the V(u)/V(L) is in the range of from 1.5 to 10.

As for the ferromagnetic powder, a ferromagnetic alloy powder is appropriately used in the uppermost magnetic layer and a ferromagnetic alloy powder or magnetoplumbite hexagonal ferrite is appropriately used in the lowermost magnetic layer. As for a specific size of the ferromagnetic powder, it is more desirable as it is smaller from the viewpoint of a low noise. However, in the case of an acicular shape, actually, it is appropriate that a mean length of a major axis is from 0.01 μm to 0.2 μm, preferably from 0.03 μm to 0.18 μm, further preferably from 0.04 μm to 0.15 μm and a mean length of a minor axis is from 0.002 μm to 0.02 μm, preferably from 0.005 to 0.018 μm, further preferably from 0.08 μm to 0.016 μm. In the case of a hexagonal ferrite, it is appropriate that a mean plate diameter (a length of a diagonal line of a hexagonal plate) is from 0.005 μm to 0.2 μm, preferably from 0.008 μm to 0.15 μm, further preferably from 0.01 μm to 0.1 μm and a plate thickness is from 0.001 μm to 0.2 μm, preferably from 0.003 μm to 0.15 μm, further preferably from 0.005 μm to 0.1 μm.

In addition to the above mentioned relationship between the uppermost and lowermost magnetic layers, the magnetic powder may have a saturation magnetization σs from 50 to 160 emu/g. More specifically, a magnetic powder having the saturation magnetization σs of from 100 to 160 emu/g, preferably from 110 to 155 emu/g is preferably used in the uppermost magnetic layer and a magnetic powder having the saturation magnetization σs of from 50 to 140 emu/g, preferably from 55 to 130 emu/g is preferably used in the lowermost magnetic layer. In the present invention, σs(u) is larger than σs(L) (σs(u)>σs(L)), but the subtraction of σs(L) from σs(u) (σs(u)−σs(L)) is appropriately in the range of from 20 to 80 emu/g.

It is preferable that the Hc of the magnetic layer is independently 2000 Oe for each of the uppermost and lowermost magnetic layers. In general, it is desirable that the Hc is higher as for a recording medium but in this invention, the Hc of the magnetic layer is optimized in view of an ability of a recording head. Specifically, it is appropriate that the Hc of the magnetic layer is from 2000 to 4000 Oe, preferably from 2100 to 3500 Oe. The Hc of the magnetic powder to be incorporated into each magnetic layer is properly selected so that the Hc of the magnetic layer falls in the above range. Specifically, it is appropriate that the Hc of the magnetic powder is in the range of from 1900 to 4200 Oe, preferably from 2000 to 3700 Oe. Magnetic powders having different Hc may be used in the uppermost and lowermost magnetic layers according to characteristics of recording signals. For example, it is known that when signals of a long wavelength and a short wavelength are simultaneously recorded, the Hc of the lowermost magnetic layer is made lower than that of the uppermost layer in order to flatten frequency characteristics (see for example, U.S. Pat. No. 5,447,782).

The residual magnetic flux densities: Br(u) and Br(L) of the uppermost and lowermost magnetic layers are preferably in the following ranges;
2000 G≦Br(u)≦7000 G, 1000 G≦Br(L)≦5000 G, preferably,
2500 G≦Br(u)≦6500 G, 1200 G≦Br(L)≦4500 G, further preferably,
3000 G≦Br(u)≦6000 G, 1500 G≦Br(L)≦4000 G.

As for a method for adjusting the Br of the uppermost and lowermost magnetic layers, a method in which magnetic powders having different σs are used in the uppermost and lowermost magnetic layer, a method in which nonmagnetic solid materials are incorporated into the uppermost and lowermost magnetic layers in a different amount, and a method in which an orientation condition is altered between the uppermost and lowermost magnetic layers can be exemplified. However, from the viewpoint of accomplishing the object of the present invention, it is preferable to use the method in which magnetic powders with different σs are used and the method in which the amount of the nonmagnetic materials in the lowermost magnetic layer are reduced compared with those contained in the uppermost layer.

The advantages of the present invention (compatibility of output improvement and noise reducing) can be obtained regardless of the orientation state of magnetic particles. In many cases, it is the so-called in-plane orientation. However, an output of the signal of the short wavelength can be improved by perpendicularly or obliquely orientating the uppermost magnetic layer and then giving a perpendicular magnetic anisotropy to the surface part of the magnetic layer. In addition, in a disc-shape medium, perpendicular orientation or random orientation is preferable in both uppermost and lowermost magnetic layers.

Publicly known inventions for magnetic multilayers can be referred to other than the preferable embodiment mentioned above. In addition, the advantages of the present invention is remarkable in the case that the total thickness of the magnetic layer is equal to or less than 0.5 μm.

As for the publicly known inventions, U.S. Pat. Nos. 4,200,678, 3,328,195, 4,423,454, 3,185,775, 3,775,178, Japanese Unexamined Patent Publication (KOKAI) Showa No.47-31602, Japanese Unexamined Patent Publication (KOKAI) Showa No.52-73002, Japanese Unexamined Patent Publication (KOKAI) Showa No.59-42375, Japanese Unexamined Patent Publication (KOKAI) Showa No.59-117732, Japanese Unexamined Patent Publication (KOKAI) Showa No.40-5351, Japanese Unexamined Patent Publication (KOKAI) Showa No.58-53024, Japanese Unexamined Patent Publication (KOKAI) Showa No.50-68304, Japanese Unexamined Patent Publication (KOKAI) Showa No.59-117733, Japanese Unexamined Patent Publication (KOKAI) Showa No.48-39995, Japanese Unexamined Patent Publication (KOKAI) Showa No.59-129935, Japanese Unexamined Patent Publication (KOKAI) Showa No.58-205928, Japanese Unexamined Patent Publication (KOKAI) Showa No.58-119610, Japanese Unexamined Patent Publication (KOKAI) Showa No.56-34, Japanese Unexamined Patent Publication (KOKAI) Showa No.53-60605, Japanese Unexamined Patent Publication (KOKAI) Showa No.57-98134, Japanese Patent Publication (KOKOKU) Showa No.57-1047 or the like can be exemplified.

Next, details for the lower nonmagnetic layer will be explained.

It is appropriate that the thickness of the lower nonmagnetic layer is from 0.1 to 5 μm, preferably from 0.3 to 4 μm, further preferably from 0.5 to 3 μm. It is preferable that the thickness is equal to or higher than 0.1 μm since a smoothing effect of a magnetic surface and a reducing effect of coating loss by calendering, which are the effects of the nonmagnetic layer of the present invention, can be obtainable. In addition, by adjusting the thickness to equal to or less than 5 μm, reduction of the filling density of the magnetic powder caused by migration of a binder or the like from the nonmagnetic layer to the magnetic surface can be prevented.

The nonmagnetic powder used in the lower nonmagnetic layer can be selected from inorganic compounds such as a metal oxide, a metal carbonate, a metal sulfate, a metal nitrate, a metal carbide and a metal sulfide. As for the inorganic compound, for example, α-alumina having an α-conversion rate equal to or higher than 90%, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, molybdenum disulfide and the like can be used alone or in combination.

Especially preferable nonmagnetic powders are titanium dioxide, zinc oxide, iron oxide, and barium sulfate, and further preferable are titanium dioxide and α-iron oxide. A particle size of these nonmagnetic powders is preferably from 0.005 to 2 μm. However, the same effect can be obtained by combining nonmagnetic inorganic powders having different particle sizes, or by widening the particle diameter distribution, even with one kind of the nonmagnetic inorganic powder, if necessary. Especially preferable is from 0.01 μm to 0.2 μm. As for a shape, an acicular, granulated and plate shapes can be used and an acicular shape is especially preferable.

The tap density is appropriately from 0.05 to 2 g/ml, preferably from 0.2 to 1.5 g/ml. The moisture content is appropriately from 0.1 to 5% by weight, preferably from 0.2 to 3% by weight. The pH is from 2 to 11, but it is especially preferable between 6 and 9. The specific surface area is appropriately from 1 to 100 m$^2$/g, preferably from 5 to 50 m$^2$/g further preferably from 7 to 40 m$^2$/g. The crystallite size is preferably from 0.01 μm to 2 μm. The oil absorption amount utilizing dibutyl phthalate (DBP) is appropriately from 5 to 100 ml/100 g, preferably from 10 to 80 ml/100 g, and further preferably from 20 to 60 ml/100 g. The specific gravity is appropriately from 1 to 12, preferably from 3 to 6. The shape may be any of an acicular shape, sphere shape, polygon shape or plate shape. The ignition loss is preferably equal to or less than 20% by weight. The Mohs' scale of hardness of the above-mentioned inorganic powder used in the present invention is preferably equal to or higher than 4. The roughness factor of the surface of these powders is preferably from 0.8 to 1.5, further preferably from 0.9 to 1.2. The absorption amount of SA (stearic acid) is from 1 to 20 μmol/m$^2$, further preferably from 2 to 15 μmol/m$^2$. The wetting heat to water at 25° C. of the nonmagnetic powder in the lower nonmagnetic layer preferably ranges from 200 erg/cm$^2$ to 600 erg/cm$^2$. Also, a solvent having the wetting heat in this range can be used.

The water molecule amount of the surface appropriately ranges from 1 to 10 pieces/100 angstroms at 100 to 400° C. The pH at the isoelectric point in water is preferably between 3 and 6.

These nonmagnetic powders are preferably subjected to surface treatment with $Al_2O_3$, $SiO_2$, $TiO_2$, $ZrO_2$, $SnO_2$, $Sb_2O_3$ or ZnO. The surface treatment resulting in especially good dispersibility is one covered with $Al_2O_3$, $SiO_2$, $TiO_2$, $ZrO_2$, and further preferably with $Al_2O_3$, $SiO_2$ or $ZrO_2$. These may be used either in combination or alone. In addition, a surface-treated layer prepared by coprecipitation may be used in view of the purpose. The surface treatment may be covering with alumina on the surface of nonmagnetic powder, followed by covering with silica and vice versa. In addition, the surface-treated layer may be a porous layer according to the purpose, but it is preferably homogeneous and dense in general.

The specific examples of the nonmagnetic powders used in the present invention include UA5600 and UA5605 manufactured by Showa Denko K.K.; AKP-20, AKP-30, AKP-50, HIT-55, HIT-100 and ZA-G1 manufactured by Sumitomo Chemical Co. Ltd.; G5, G7 and S-1 manufactured by Nippon Chemical Industry Co. Ltd.; TF-100, TF-120, TF-140 and R516 manufactured by Toda Kogyo Corporation; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 manufactured by Ishihara Sangyo Co. Ltd.; ECT-52, STT-4D, STT-30D, STT-30 and STT-65C manufactured by Titan Kogyo K.K.; T-1 manufactured by Mitsubishi Material Co. Ltd.; NS-O, NS-3Y and NS-8Y manufactured by Nippon Shokubai Co. Ltd.; MT-100S, MT-100T, MT-150W, MT-500B, MT-600B and MT-100F manufactured by Tayca Corporation; FINEX-25, BF-1, BF-10, BF-20 BF-1L and BF-10P manufactured by Sakai Chemical Industry Co. Ltd.; DEFIC-Y and DEFIC-R manufactured by Dowa Mining Co. Ltd.; Y-LOP manufactured by Titan Kogyo K.K. and sintered products thereof can be exemplified.

"Characterization of Power Surfaces Academic Press" can be referred to for producing methods of these pigments.

In addition, the publicly known effect of Rs can be reduced by mixing carbon black into the lower nonmagnetic layer. For this, furnace black for rubbers, thermal for rubbers, black for coloring, acetylene black or the like can be utilized. It is appropriate that the specific surface area is from 100 to 500 $m^2/g$, preferably from 150 to 400 $m^2/g$ and the DBP oil absorption amount is from 20 to 400 ml/100 g, preferably from 30 to 200 ml/100 g. The particle diameter is appropriately from 5 nm to 80 nm, preferably from 10 to 50 nm, further preferably from 10 to 40 nm. It is preferable that the pH is from 2 to 10, the moisture content is from 0.1 to 10% and the tap density is from 0.1 to 1 g/ml.

Specific examples of carbon blacks for use in the present invention include BLACK PEARLS 2000, 1300, 1000, 900, 800, 880, 700 and VULCAN XC-72 manufactured by Cabot Corporation; #3050B, 3150B, 3250B, #3750B, #3950B, #950, #650B, #970B, #850B and MA-600 manufactured by Mitsubishi Chemical Corp.; CONDUCTEX SC, RAVEN 8800, 8000, 7000, 5750, 5250, 3500, 2100, 2000, 1800, 1500, 1255 and 1250 manufactured by Columbia Carbon Co. Ltd.; and Ketjen black EC manufactured by Lion Akzo Co. Ltd.

These carbon blacks may be ones surface-treated with a dispersant or grafted with resin, and ones whose surface has been partly graphitized. Further, before added to a coating liquid, the carbon black may be dispersed in advance into the binder. These carbon blacks can be used within the range of less than 50% by weight with respect to said inorganic powder and within the range of less than 40% by weight with respect to the total weight of the nonmagnetic layer. These carbon blacks can be used alone or in combination. As for the carbon blacks usable in the present invention, for example, "Carbon Black Binran" edited by Carbon Black Association can be referred to.

The lower nonmagnetic layer can be added with organic powder according to the purpose. For example, acryl styrene based resin powder, benzoguanamine resin powder, melamine based resin powder, and phthalocyanine based pigment can be exemplified, but following scan be used such as polyolefin based resin powder, polyester based resin powder, polyamide based resin powder, polyimide based resin powder and a polyfluorethylene resin. As the method for manufacturing those above, methods described in Japanese Unexamined Patent Publication (KOKAI) Showa No.62-18564, Japanese Unexamined Patent Publication (KOKAI) Showa No.60-255827 or the like can be used. These nonmagnetic powders are used at the weight ratio ranging from 20 to 0.1 and at a volume ratio ranging from 10 to 0.1 with respect to the binder. Especially preferable is the volume ratio of the binder ranging from twice to 0.3 times compared with the volume of the powder contained in the lower nonmagnetic layer. It is to be noted that an undercoat layer is formed in the ordinary magnetic recording medium for the purpose of improving adhesive force between the support and the magnetic layer or the like where the thickness is equal to or less than 0.5 $\mu m$, so that it is different from the lower nonmagnetic layer of the present invention.

In the present invention, an undercoat layer is also preferably formed in order to improve adhesive force between the lower nonmagnetic layer and the support. As a binder, a lubricant, a dispersant, an additive, a solvent, a dispersing method or the like of the nonmagnetic layer, those of the magnetic layer can be adopted. Especially, as for an amount and kinds of the binder, an added amount and kinds of the additive and the dispersant, the publicly known techniques for the magnetic layer can be applied.

Next, details as for the magnetic layer of the present invention other than the above-mentioned will be explained. As for a ferromagnetic powder used in the present invention, a ferromagnetic powder such as a ferromagnetic alloy micropowder having Fe, Ni or Co as a main component (equal to or higher than 75%), barium ferrite and strontium ferrite can be used, but a ferromagnetic alloy powder having α-Fe as a main component is preferred to the uppermost magnetic layer. These ferromagnetic powders may contain atoms, other than the predetermined atom, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr or B. Before dispersed, these ferromagnetic powders may be treated in advance with a dispersant, a lubricant, a surfactant, an antistatic agent or the like. It is specifically described in Japanese Patent Publication (KOKOKU) Showa No. 44-14090, Japanese Patent Publication (KOKOKU) Showa No. 45-18372, Japanese Patent Publication (KOKOKU) Showa No. 47-22062, Japanese Patent Publication (KOKOKU) Showa No. 47-22513, Japanese Patent Publication (KOKOKU) Showa No. 46-28466, Japanese Patent Publication (KOKOKU) Showa No. 46-38755, Japanese Patent Publication (KOKOKU) Showa No. 47-4286, Japanese Patent Publication (KOKOKU) Showa No. 47-12422, Japanese Patent Publication (KOKOKU) Showa No. 47-17284, Japanese Patent Publication (KOKOKU) Showa No. 47-18509, Japanese Patent Publication (KOKOKU) Showa No. 47-18573, Japanese Patent Publication (KOKOKU) Showa No. 39-10307, Japanese Patent Publication (KOKOKU) Showa No. 48-39639, U.S. Pat. Nos. 3,026,215, 3,031,341, 3,100,194, 3,242,005, 3,389,014 and the like.

Among the above-mentioned ferromagnetic powders, the ferromagnetic alloy micro powder may contain a small amount of hydroxide or oxide. The ferromagnetic alloy micro powder obtained from publicly known producing methods can be used and the following method can be exemplified; a method for reducing composite organic acid salts (oxalate, mainly) with a reductive gas such as hydrogen; a method for obtaining Fe, Fe-Co particles or the like by reducing an iron oxide with a reductive gas such as hydrogen; a method for thermally decomposing metal carbonyl compounds; a method for reducing by adding reducing agents such as sodium boron hydride, hypophosphite or hydrazine to a ferromagnetic metal solution; and a method for obtaining a micro powder by evaporating metal in a low-pressure inert gas. The ferromagnetic alloy powder thus obtained can be used after subjected to any of the publicly known slow oxidation treatment methods, that is, a method of dipping the powder in an organic solvent before dried, a method of dipping the powder in an organic solvent, feeding thereafter an oxygen-containing gas to form an oxide film on the surface of each powder, and then drying the powder, and a method of adjusting partial pressures of an oxygen gas and an inert gas, without using an organic solvent, to form an oxide coating film on the surface of the powder.

The alloy acicular ferromagnetic powder in the magnetic powder of the present invention appropriately has a specific surface area by BET method ranging from 25 to 80 $m^2/g$, preferably from 40 to 70 $m^2/g$. Noises are suppressed low by setting it equal to or higher than 25 $m^2/g$, and the problem that surface property is hardly obtained is not occurred by setting it equal to or less than 80 $m^2/g$. A crystallite size of the ferromagnetic powder particle in the magnetic layer of the present invention is from 450 to 50 Å, preferably from 350 to 80 Å. An acicular ratio is equal to or less than 18, preferably equal to or less than 15.

In addition, the ferromagnetic powder used in the present invention rather preferably has a small amount of voids and its value is equal to or less than 20% by volume, further preferably equal to or less than 5% by volume. In order to accomplish the SFD (Switching Field Distribution) equal to or less than 0.6 of this ferromagnetic powder, it is preferable to make the Hc distribution of the ferromagnetic powder small. For this, methods of making the particle distribution of goethite good, preventing the sintering of γ-hematite or the like can be exemplified.

Also in the present invention, especially for the lowermost magnetic layer, barium ferrite, strontium ferrite, lead ferrite and calcium ferrite, substitutes thereof, a Co substitute or the like, and a hexagonal Co powder can be used as a plate-shape hexagonal ferrite. Specifically, magnetoplumbite type barium ferrite and strontium ferrite, further, magnetoplumbite type barium ferrite and strontium ferrite partly containing a spinel phase can be exemplified. Especially preferable is a Co substitute of barium ferrite or strontium ferrite.

In addition, in order to control a coercive force, the above-mentioned hexagonal ferrite added with atoms such as Co—Ti, CO—Ti—Zr, Co—Ti—Zn, Ni—Ti—Zn, Ir—Zn or the like can be used. The hexagonal ferrite is usually a hexagonal plate-shape particle and its particle diameter means a plate width of the hexagonal plate-shape particle, which is measured by an electron microscope.

The particle size of the magnetic particle is as mentioned above.

The plate-shape ratio (particle diameter/plate thickness) is appropriately from 1 to 10, preferably from 3 to 7. In addition, the specific surface area of these hexagonal ferrite micro powders measured by BET method (SBET) is preferably from 25 to 70 $m^2/g$.

As for a binder used in the magnetic layer and the nonmagnetic layer of the present invention, publicly known ones such as a thermoplastic resin, a thermosetting resin, a reactive resin and a mixture thereof are used. As for the thermoplastic resin, those having a glass transition temperature ranging from −100 to 150° C., a number average molecular weight ranging from 1,000 to 200,000, preferably from 10,000 to 100,000, and a degree of polymerization ranging from about 50 to 1,000 can be used. As for such examples, polymers or copolymers containing the following compounds as a constituting unit, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber based resins can be exemplified. In addition, examples of thermosetting resins or reactive type resins include phenol resins, epoxy resins, polyurethane thermosetting type resins, urea resins, melamine resins, alkyd resins, acrylic based reactive resins, formaldehyde resins, silicone resins, epoxy-polyamide resins, a mixture of polyester resin and isocyanate pre-polymer, a mixture of polyesterpolyol and polyisocyanate, a mixture of polyurethane and polyisocyanate and the like.

The details about these resins are described in "Plastic Handbook", published by Asakura Shoten. Moreover, publicly known electron radiation curing resins can be also used in the nonmagnetic layer and magnetic layer. The resins mentioned above can be used alone or in combination. As the preferred resins, a combination of polyurethane resins and at least one resin selected from vinyl chloride resins, vinyl chloride-vinyl acetate resins, vinyl chloride-vinyl acetate-vinyl alcohol resins, vinyl chloride-vinyl acetate-maleic anhydride copolymers, or these resins combined with polyisocyanate can be exemplified. As the structure of the polyurethane resin, publicly known resins such as polyesterpolyurethane, polyether-polyurethane, polyether-polyesterpolyurethane, polycarbonate-polyurethane, polyesterpolycarbonate-polyurethane, polycaproractone-polyurethane or the like can be used. With respect to all binders showed here, those introduced at least a polar group selected from —COOM, —$SO_3M$, —$OSO_3M$, —P=O $(OM)_2$, —O—P=O$(OM)_2$ (where M represents an hydrogen atom or an alkali metal base), —OH, —$NR_2$, =$N^+R_3$ (where R represents an hydrocarbon group), an epoxy group, —SH, —CN or the like through copolymerization or addition reaction are preferably used, if necessary, to obtain further excellent dispersibility and durability. The amount of such polar groups is from $10^{-1}$ to $10^{-8}$ mol/g, preferably from $10^{-2}$ to $10^{-6}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Corporation; MPR-TA, MPR-TA5, MPR-TAL, MPR-TSN, MPR-TMF, MPR-TS, MPR-TM and MPR-TAO manufactured by Nissin Kagaku Kogyo K.K.; 1000W, DX80, DX81, DX82, DX83 and 100FD manufactured by Denki Kagaku Kogyo K.K.; MR-105, MR110, MR100 and 400X-110A manufactured by Nippon Zeon Co.Ltd.; Nippollan N2301, N2302 and N2304 manufactured by NIPPON POLYURETHANE Co. Ltd.; Pandex T-5105, T-R3080, T-5201, Burnock D-400, D-210-80, Crisvon 6109 and 7209 manufactured by Dainippon Ink And Chemicals Incorporated.; Vylon UR8200, UR8300, UR-8600, UR-5500, UR-4300, RV530 and RV280 manufactured by Toyobo Co. Ltd.; Daipheramine 4020, 5020, 5100, 5300, 9020, 9022 and 7020 manufactured by Dainichiseika Color & Chemicals Mfg. Co. Ltd.; MX 5004 manufactured by Mitsubishi Kasei Corporation; Sunprene SP-150, TIM-3003 and TIM-3005 manufactured by Sanyo Chemical Industries Co. Ltd.; Salan F310 and F210 manufactured by Asahi Chemical Industry Co. Ltd. and the like.

The binder used in the magnetic layer of the present invention is used in an amount ranging from 5 to 50% by weight, preferably from 10 to 30% by weight with respect to the ferromagnetic powder. Preferably, in the case of using a vinyl chloride based resin, it is used in the range of from 5 to 30% by weight, in the case of using polyurethane, it is used in the range of from 2 to 20% by weight, in the case of using polyisocyanate, it is used in the range of from 2 to 20% by weight and these are used in combination. In the present invention, in the case of using polyurethane, it is preferable that the glass transition temperature is from −50 to 100° C., the elongation at break is from 100 to 2000%, the stress at break is from 0.05 to 10 kg/cm$^2$ and the yield point is from 0.05 to 10 kg/cm$^2$.

The magnetic recording medium of the present invention comprises two or more magnetic layers and the nonmagnetic layers. Accordingly, if necessary, it is possible to change the followings between the nonmagnetic layer and the uppermost magnetic layer or lowermost magnetic layer or optionally other magnetic layers if provided. For example, an amount of the binder, an amount of the vinyl chloride resin, the polyurethane resin, the polyisocyanate or the other resins in the binder, a molecular weight and an amount of polar groups of each resin constituting each magnetic layer, or physical characteristics of aforementioned resins or the like can be changed. Publicly known techniques for multiple magnetic layers also can be applied. For example, if the binder amount of the uppermost and lowermost magnetic layers or the nonmagnetic layer is changed, it is effective to increase the binder amount of the uppermost magnetic layer for reduction of scratches on the surface of the magnetic layer. A head tough against ahead can be improved by increasing the binder amount in the magnetic layer or the nonmagnetic layer other than the uppermost magnetic layer to give flexibility.

As for polyisocyanates used in the present invention, isosyanates such as tolylene diisocyanate, 4,4'-diphenylmethane diisosyanate, hexamethylene diisocyanate, xylylene diisosyanate, naphtylene-1,5-diisosyanate, o-toluidine diisosyanate, isophorone diisocyanate, triphenylmethane triisocyanate or the like, products of these isocyanates with polyalcohols, or polyisocyanates producted by condensation of isocyanates can be used. These isocyanates are commercially available under the following trade names; Coronate L, Coronate HL, Coronate 2030, Coronate 2031, Millionate MR and Millionate MTL manufactured by Nippon Polyurethane Co. Ltd.; Takenate D-102, Takenate D-110N, Takenate D-200 and Takenate D-202 manufactured by Takeda Chemical Industries Co. Ltd.; Desmodule L, Desmodule IL, Desmodule N and Desmodule HL manufactured by Sumitomo Bayer Co. Ltd. and so on. For both the nonmagnetic layer and the uppermost and lowermost magnetic layers, these can be used alone or in combination of two or more by taking advantage of a difference in curing reactivity.

As for the carbon black used in the present invention, furnace black for rubbers, thermal for rubbers, black for coloring, acetylene black or the like can be used. It is preferable that the specific surface area is from 5 to 500 m$^2$/g, the DBP oil absorption amount is from 10 to 400 ml/100 g, the particle diameter is from 5 nm to 300 nm, the pH is from 2 to 10, the moisture content is from 0.1 to 10% by weight and the tap density is from 0.1 to 1 g/ml. Specific examples of these carbon blacks include BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Chemical Corp.; CONDUCTEX SC, RAVEN 150, 50, 40 and 15 manufactured by Columbia Carbon Co. Ltd. or the like. These carbon blacks may be ones surface-treated with a dispersant or grafted with resin, and ones whose surface has been partly graphitezed. Further, before added to a coating liquid, the carbon black may be dispersed in advance into the binder. These carbon blacks can be used alone or in combination.

In the case of using the carbon black, it is preferably used in an amount ranging from 0.1 to 30% by weight with respect to the amount of the ferromagnetic powder. The carbon black has functions in the magnetic layer to prevent static buildup, to reduce the friction coefficient, to lessen light-transmittance, or to improve strength for coating. These effects are different depending on kinds of carbon black. Therefore, it is, as a matter of course, possible in the present invention to properly use carbon black different in kinds, amount and combination, according to the purpose, between the uppermost magnetic layer, the lowermost magnetic layer and the lower nonmagnetic layer depending on the mentioned properties such as particle size, oil absorption amount, electrical conductivity, pH or the like. As for the examples of the carbon black usable in the invention, Carbon Black Binran (Carbon Black Handbook) edited by Carbon Black Association, for example, can be referred to.

In the magnetic layer and/or the nonmagnetic layer of the present invention, abrasives can be contained. As for the abrasives used, publicly known materials having 6 or higher on Mohs' scale of hardness can be used alone or in combination; for example, α-alumina having an α-conversion rate equal to or higher than 90%, β-alumina, silicon carbide, chromium oxide, cerium oxide, α-iron oxide, corundum, artificial diamond, silicon nitride, titanium carbide, titanium dioxide, silicon dioxide and boron nitride. In addition, a composite composed of two or more of these abrasives (e.g., one obtained by surface-treating one abrasive with another) may also be used. Although these abrasives may contain compounds or elements other than the main component in some cases, the same effect is obtainable if the content of the main component is equal to or higher than 90% by weight. The particle size of these abrasives is preferably from 0.01 to 2 μm. However, the same effect is given by combining abrasives different in particle size or enhancing the distribution of the particle size even in the case of using the abrasive alone. The abrasive preferably has a tap density of from 0.3 to 2 g/ml, a moisture content of from 0.1 to 5% by weight, a pH of from 2 to 11 and a specific surface area of from 1 to 30 m$^2$/g. Although the particles of the abrasives used in the present invention may have any of an acicular, spherical and cubical shape, particles having corners on the part of the shape is preferred because of its good abrasive property. Specific examples of the abrasive used in the present invention include AKP-20, AKP-30, AKP-50, HIT-50, and HIT-100 manufactured by Sumitomo Chemical Co. Ltd.; G5, G7 and S-1 manufactured by Nippon Chemical Industrial Co. Ltd.; TF-100 and TF-140 manufactured by Toda Kogyo K.K. and the like. It is, as a matter of course, possible in the present invention to properly use abrasives different in kinds, amount and combination, according to the purpose, between the magnetic layer (uppermost and lowermost layers) and the nonmagnetic layer. These abrasives may be added into the magnetic paints after dispersing treatment in advance with the binder. The number of the abrasives existing on the surface and the side faces of the magnetic layer of the magnetic recording medium of the present invention is preferably equal to or higher than 5 pieces/100 $\mu m^2$.

As the additives used in the magnetic layer and nonmagnetic layer of the present invention, the additives having the lubricating effects, the antistatic effects, the dispersing effects, the plasticizing effects or the like are used. Examples of the additives include molybdenum disulfide; tungsten graphite disulfide; boron nitride; graphite fluoride; a silicone oil; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having a carbon number of 10 to 24 which may contain an unsaturated bond or bonds or may be branched and their metal salts (e.g., Li, Na, K, Cu); monohydric, dihydric, trihydric, tetrahydric, pentahydric and hexahydric alcohols having a carbon number of 12 to 22 which may contain an unsaturated bond or bonds or may be branched; alkoxy alcohols having a carbon number of 12 to 22 which may contain an unsaturated bond or bonds or may be branched; monofatty acid esters, difatty acid esters, or trifatty acid esters comprising any of monobasic fatty acids having a carbon number of 10 to 24 which may contain an unsaturated bond or bonds or may be branched; and monohydric, dihydric, trihydric, tetrahydric, pentahydric and hexahydric alcohols having a carbon number of 2 to 12 which may contain an unsaturated bond or bonds or to be branched; fatty acid esters of a monoalkyl ethers of alkylene oxide polymerized products; fatty acid amides having a carbon number of 8 to 22; and aliphatic amines having a carbon number of 8 to 22.

Specific examples of the additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol and lauryl alcohol. It is also possible to use nonionic surfactants, such as alkylene oxide based, glycerin based, glycidol based and alkylphenolethylene oxide adducts; cationic surfactants, such as cyclic amines, ester amides, quaternary ammonium salts, hydantoin derivatives, heterocycles, phosphoniums or sulfoniums; anionic surfactants containing acidic groups, such as carboxylic acid, sulfonic acid, phosphoric acid, sulfuric ester group and a phosphoric ester group; and ampholytic surfactants, such as amino acids, amino sulfonic acids, sulfuric or phosphoric esters of amino alcohols and alkyl betaine type.

Details of these surfactants are described in "A Guide to Surfactants" (published by Sangyo Tosho Co. Ltd.). These lubricants, antistatic agents and the like need not be 100% pure but may contain impurities, such as isomers, unreacted materials, side reaction products, decomposition products and oxides in addition to the main components. The content of these impurities is preferably equal to or less than 30% by weight, more preferably equal to or less than 10% by weight. These lubricants and surfactants usable in the present invention may be different in kinds and amount between the nonmagnetic layer and the magnetic layer according to the purpose. It is conceivable, for example, to control bleeding on the surface with use of fatty acids having different melting points between the nonmagnetic layer and the magnetic layer, to control bleeding on the surface with use of esters having different boiling points and polarities, to improve the coating stability by adjusting the amount of surfactants, to improve the lubricant effects by increasing the amount of the lubricants added to the nonmagnetic layer or the like. Such designing is not limited to the above examples as a matter of course. All or some of the additives used in the present invention may be added at any stage of the manufacturing process for the magnetic paint; for example, they may be mixed with the ferromagnetic powder before a kneading step; added at a kneading step for kneading the ferromagnetic powder, the binder, and the solvent; added at a dispersing step; added after dispersing; or added immediately before coating. The purpose may be accomplished by coating a part or all of the additives by simultaneous or sequential coating, after the magnetic layer is coated in accordance with the purpose. The lubricants may be coated on the surface of the magnetic layer depending on the purpose, after calendar processing or making slits.

The lubricants usable in the present invention are available under the trade names of, for example, NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl Stearate, Butyl Laurate, and Erucic Acid manufactured by NOF corp.; Oleic Acid manufactured by Kanto Chemical Co. Ltd; FAL-205 and FAL-123 manufactured by Takemoto Yushi K.K.; NJLUBLO, NJLUBIPM and Sansosyzer E4030manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co. Ltd.; Armide P, Armide C and Armoslip CP manufactured by Lion Armour Co. Ltd.; Duomine TDO manufactured by Lion Corp.; BA-41G manufactured by Nisshin Oil Mills, Co. Ltd.; Profan 2012E, Newpole PE61, Ionet MS-400, Ionet MO-200, Ionet DL-200, Ionet DS-300, Ionet DS-1000 and Ionet DO-200 manufactured by Sanyo Chemical Industries Co. Ltd.

As for the thickness construction of the magnetic layer of the present invention, it is appropriate that the flexible nonmagnetic support is from 1 to 100 $\mu m$, preferably from 3 to 80 $\mu m$. The total thickness of the magnetic layer and the nonmagnetic layer can be selected from the range of from 1/100 to twice of the thickness of the flexible nonmagnetic support.

In addition, an undercoat layer can be provided between the flexible nonmagnetic support and the nonmagnetic layer for the purpose of improving adhesion. The thickness of this undercoat layer is from 0.01 to 2 $\mu m$, preferably from 0.02 to 0.5 $\mu m$. In addition, a backcoat layer may be provided on the opposite side to the magnetic layer side of the nonmagnetic support. This thickness is from 0.1 to 2 μm, preferably from 0.3 to 1.0 μm. These undercoat layers and backcoat layers can be used as properly selected from publicly known ones.

As for the flexible nonmagnetic support used in the present invention, publicly known films such as polyesters such as polyethylene terephthalate and polyethylene naphthalate, polyolefins, cellulose triacetate, polycarbonate, polyamide, polyimide, polyamide-imide, polysulfon, aramide, aromatic polyamide or the like can be exemplified. These supports may be subjected beforehand to corona discharge treatment, plasma treatment, treatment for enhancing adhesion, heat treatment, dust removal or the like. As for the flexible nonmagnetic support, preferable are those having a centerline average surface roughness (cutoff value of 0.25 mm) equal to or less than 0.03 μm, preferably equal to or less than 0.02 μm, further preferably equal to or less than 0.01 μm. In addition, these nonmagnetic supports preferably have not only a small centerline average surface roughness but also no coarse projection having a size equal to or higher than 1 μm. In addition, a roughness shape of the surface is freely controlled by a size and amount of fillers added in the support, if necessary. Examples of these fillers include oxides and carbonates of Ca, Si and Ti, further, organic micro powders such as acryl based. It is appropriate that a F-5 value in the tape running direction of the nonmagnetic support used in the present invention is preferably from 5 to 50 kg/mm$^2$, and a F-5 value in the tape width direction is preferably from 3 to 30 kg/mm$^2$, and the F-5 value in the tape longitudinal direction is generally higher than that in the tape width direction, but it is not being limited if it is necessary that the strength, especially, in the width direction is enhanced.

It is appropriate that the thermal shrinkage of the support in the tape running direction and in the tape width direction at 100° C. for 30 minutes is preferably equal to or less than 3%, more preferably equal to or less than 1.5%, and the thermal shrinkage at 80° C. for 30 minutes is preferably equal to or less than 1%, more preferably equal to or less than 0.5%. It is preferable that the break strength in the both directions is preferably from 5 to 100 kg/mm$^2$ and the modulus of elasticity is preferably from 100 to 2,000 kg/mm$^2$.

The producing method for the magnetic recording medium of the present invention will be explained below.

The process for producing the magnetic paints for the magnetic recording medium of the present invention comprises at least a kneading step, a dispersing step, and a mixing step to be carried out, if necessary, before or after the kneading and dispersing steps. The individual step may be performed separately at two or more stages. All of the starting materials to be used in the invention, including the ferromagnetic powder, binders, carbon black, abrasives, antistatic agents, lubricants, solvents and so on, may be added at the beginning of or during any of the steps. Moreover, the individual material may be divided and added in two or more steps; for example, polyurethane may be divided and added in the kneading step, the dispersing step, and the mixing step for viscosity adjustment after dispersing.

In order to accomplish the purpose of the present invention, a conventional publicly known manufacturing technique may be utilized as a part of the process, as a matter of course. In the kneading process, it is possible to obtain a high residual magnetic flux density (Br) by using a kneader having a strong kneading force, such as a continuous kneader or a pressure kneader. In the case where the continuous kneader or the pressure kneader is used, it is appropriate that the ferromagnetic powder and all or part of the binder (preferably, equal to or higher than 30% of the entire binder) are kneaded in the range of from 15 to 500 parts with respect to 100 parts of the ferromagnetic powder. Details of the kneading treatment are described in U.S. Pat. Nos. 4,946,615 and 5,300,244. In the case where the lower nonmagnetic layer liquid is prepared, a dispersing medium having a high specific gravity is desirably utilized, preferably, zirconia beads.

Organic solvents used in producing the magnetic recording medium of the present invention may be used at the optional ratio. Examples of the organic solvents include ketones, such as acetone, methyl ethyl ketone, methyl isobutyl ketone, diisobutyl ketone, cyclohexanone, isophorone and tetrahydrofuran; alcohols, such as methanol, ethanol, propanol, butanol, isobutyl alcohol, isopropyl alcohol and methylcyclohexanol; esters, such as methyl acetate, butyl acetate, isobutyl acetate, isopropyl acetate, ethyl lactate and glycol acetate; glycol ether based, such as glycol dimethyl ether, glycol monoethyl ether and dioxane; aromatic hydrocarbons, such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide; and hexane. These organic solvents need not be 100% pure but may contain impurities, such as isomers, unreacted materials, side reaction products, decomposition products, oxides and moisture in addition to the main components. The content of these impurities is preferably equal to or less than 30%, more preferably equal to or less than 10%. As for the organic solvents used in the present invention, preferably the same kinds are used in the coating liquid for the magnetic layer and in the coating liquid for the nonmagnetic layer, but the added amount may be changed. It is appropriate to raise the stability of coating, in the nonmagnetic layer, using a solvent having a high surface tension, (e.g., cyclohexane, dioxane or the like). More specifically, it is preferable that the arithmetic mean value of the magnetic layer solvent compositions is not less than the arithmetic mean value of the nonmagnetic layer solvent compositions. To improve the dispersibility, a solvent having a strong polarity to some extent is preferred. It is preferable that the content of the solvent having a permittivity equal to or higher than 15 is equal to or higher than 50% in the solvent compositions. In addition, the dissolution parameter is preferably from 8 to 11.

The followings can be proposed as coating apparatuses and methods for carrying out the coating to form the magnetic recording medium having a multilayer structure as disclosed in the present invention.

1. A nonmagnetic layer is first applied with a coating apparatus commonly used for magnetic paint coating, e.g., a gravure coating, roller coating, blade coating, or extrusion coating apparatus, and magnetic layers are then applied, while the nonmagnetic layer is still in a wet state, by means of a support-pressing extrusion coating apparatus such as those disclosed in U.S. Pat. Nos. 4,480,583; 4,681,062; and 5,302,206.
2. Magnetic and nonmagnetic layers are applied almost simultaneously using a single coating head having two built-in slits for passing coating liquids, such as those disclosed in U.S. Pat. Nos. 4,854,252; 5,072,688; and 5,302,206.
3. Magnetic and nonmagnetic layers are applied almost simultaneously using an extrusion coating apparatus with a backup roller as disclosed in Japanese Unexamined Patent Publication (KOKAI) Heisei No.2-174965.

It is to be noted that, in order to prevent lowering the electromagnetic characteristics or the like of the magnetic recording medium by aggregation of ferromagnetic particles, shearing may preferably apply to the coating liquid in the coating head by a method such as those disclosed in U.S. Pat. No. 4,828,779 and Japanese Unexamined Patent Publication (KOKAI) Heisei No.1-236,968. In addition, the viscosity of the coating liquid appropriately satisfies the numerical range as specified in U.S. Pat. No. 4,994,306. It is preferable to use a solenoid equal to or higher than 1,000 G and a rare earth metal magnet equal to or higher than 2,000 G in a manner that the same polarities of those above oppose to each other with the concurrent use. Furthermore, it is preferable to set a proper drying process in advance before the orientation so that the post-dry orientation characteristics show the highest.

In addition, in the case that the present invention is applied as a disc medium, it is also possible to adopt such an orientation method as the orientation is rather randomize. In addition, the direction to orientate for changing the orientation direction of the uppermost magnetic layer and lowermost magnetic layer is not necessarily a longitudinal direction and in-plane direction and the orientation can be done obliquely to the vertical direction, width direction and thickness direction.

Moreover, plastic rollers having heat resistance such as epoxy, polyimide, polyamide, polyimide-amide are used as a calender processing rollers. In addition, it is processed with metal roller each other. The processing temperature is preferably equal to or higher than 70° C., further preferably equal to or higher than 80° C. The line pressure is preferably from 200 kg/cm, further preferably from 300 kg/cm.

The friction coefficient with respect to SUS420J of the magnetic layer surface and its opposite surface of the magnetic recording medium of the present invention is preferably equal to or less than 0.5, further equal to or less than 0.3, the surface specific resistivity is preferably from $10^4$ to $10^{12}$ Ω/sq, the modulus of elasticity at 0.5% elongation of the magnetic layer in each of the running direction and the width direction is preferably from 100 to 2,000 kg/mm$^2$ and the strength at break is preferably from 1 to 30 kg/cm$^2$. The modulus of elasticity of the magnetic recording medium in each of the running direction and the longitudinal direction is preferably from 100 to 1,500 kg/mm$^2$, the residual elongation is preferably equal to or less than 0.5%, the thermal shrinkage rate at any temperature of 100° C. or below is preferably equal to or less than 1%, further preferably equal to or less than 0.5%, the most preferably equal to or less than 0.1%.

The glass transition temperature (i.e., the temperature at which the loss elastic modulus in dynamic viscoelasticity measurement carried out at 110 Hz is maximum) of the magnetic layer is preferably from 50° C. to 120° C., and that of the lower nonmagnetic layer is preferably from 0° C. to 100° C. The loss elastic modulus is preferably in the range of from $1\times10^8$ to $8\times10^9$ dyne/cm$^2$ and the loss tangent is preferably equal to or less than 0.2. An adhesion failure easily occurs due to excessive large loss tangent.

The content of the residual solvent in the magnetic layer is preferably equal to or less than 100 mg/m$^2$, further preferably equal to or less than 10 mg/m$^2$. It is preferable that the content of the residual solvent in the second layer is lower than that in the first layer. The void percentage of the magnetic layer is preferably equal to or less than 30% by volume, further preferably equal to or less than 20% by volume in each of the lower nonmagnetic layer and the magnetic layer. Although a lower void percentage is preferable for attaining higher output, there are some cases in which a certain degree of void percentage is preferably ensured according to the purpose; for example, in the case of a magnetic recording medium for data recording putting an importance on the repeating use, higher void percentage inmost cases brings about better running durability. As for the magnetic characteristics of the magnetic recording medium of the present invention, if measured at a magnetic field of 5 kOe, A squareness in the tape running direction is equal to or higher than 0.70, preferably equal to or higher than 0.80, further preferably equal to or higher than 0.90. The squareness in the two directions perpendicular to the tape running direction is preferably equal to or less than 80% with respect to the squareness in the running direction. A SFD (Switching field Distribution) of the magnetic layer is preferably equal to or less than 0.6. The centerline surface roughness of the magnetic layer (cutoff value of 0.25 mm) Ra is preferably from 1 nm to 10 nm, but its value should be properly set according to the purpose. In order to improve electromagnetic characteristics, Ra is more desirable as it is smaller, on the contrary, it is more desirable as it is larger in order to improve running durability. A roughness of root mean square RRMS obtained from the evaluation by an Atomic Force MicroScope (AFM) is preferably in the range of from 2 nm to 15 nm.

The magnetic recording medium according to the present invention comprises the lower nonmagnetic layer and the uppermost and lowermost magnetic layers, and it will be easily presumed that the physical characteristics may be different between the nonmagnetic layer and the uppermost and lowermost magnetic layers depending on the purpose. For example, the uppermost magnetic layer can be made to have a high modulus of elasticity to improve running durability, at the same time, the lowermost magnetic layer and the nonmagnetic layer can be made to have a lower modulus of elasticity than that of the uppermost magnetic layer to have better head touching of the magnetic recording medium. As for physical characteristics of each magnetic layer, publicly known techniques concerning magnetic multilayer can be referred to. For example, many inventions giving higher Hc to an uppermost magnetic layer than that of a lowermost magnetic layer is disclosed in, for example, Japanese Patent Publication (KOKOKU) Showa No.37-2218, Japanese Unexamined Patent Publication (KOKAI) Showa No.58-56228 or the like. It is possible to record to the magnetic layer having higher Hc by making the magnetic layer thin as disclosed in the present invention.

EXAMPLES

Next, details of the present invention will be specifically explained in reference to the following examples. "Parts means parts by weight" in the examples.

| ① Nonmagnetic layer | |
|---|---|
| Nonmagnetic powder α-Fe$_2$O$_3$ | 80 parts |
| Mean length of major axis: 0.1 μm | |
| Specific surface area by BET method: 48 m$^2$/g | |
| pH 8, Fe$_2$O$_3$ content: equal to or higher than 90% | |
| DBP oil absorption amount: 27–38 ml/100 g | |
| Surface covering compound: Al$_2$O$_3$ | |
| Carbon black | 20 parts |
| Average primary particle diameter: 16 nm | |
| DBP oil absorption amount: 80 ml/100 g | |
| pH 8.0 | |
| Specific surface area by BET method: 250 m$^2$/g | |
| Volatile content: 1.5% | |
| Vinyl chloride copolymer | 12 parts |
| MR-110 manufactured by Nippon Zeon Co. Ltd. | |
| Polyester polyurethane resin | 5 parts |
| Neopentyl glycol/Caprolactonepolyol/ | |

-continued

| | |
|---|---|
| MDI (4,4'-diphenylmethane-diisocyanate) = 0.9/2.6/1 Containing 1 × 10⁻⁴ eq/g of —SO₃Na group | |
| Butyl stearate | 1 parts |
| Stearic acid | 1 parts |
| Methyl ethyl ketone | 100 parts |
| Cyclohexanone | 50 parts |
| Toluene | 50 parts |
| ② Uppermost magnetic layer | |
| Ferromagnetic metal powder Composition Fe/Co = 80/20 (atomic ratio) Hc: 2400 Oe Specific surface area by BET method: 54 m²/g Crystallite size: 165 Å Y; 4.5% by weight/Fe, Al; 3.5% by weight/Fe, Mean length of major axis: 0.1 μm, Mean length of minor axis: 0.017 μm, (Acicular ratio 6) Particle volume: 22700 nm³ σs: 150 emu/g | 100 parts |
| Vinyl chloride based copolymer MR-110 manufactured by Nippon Zeon Co. Ltd. | 12 parts |
| Polyester polyurethane resin Neopentyl glycol/Caprolactonepolyol/ MDI (4,4'-diphenylmethane-diisocyanate) = 0.9/2.6/1 Containing 1 × 10⁻⁴ eq/g of —SO₃Na group | 5 parts |
| α-alumina (particle size of 0.18 μm) | 5 parts |
| Carbon black (particle size of 0.10 μm) | 0.5 parts |
| Butyl stearate | 1 parts |
| Stearic acid | 2 parts |
| Methyl ethyl ketone | 90 parts |
| Cyclohexanone | 30 parts |
| Toluene | 60 parts |
| ③ Lowermost magnetic layer | |
| Ferromagnetic metal powder Composition Fe/Co = 85/15 (atomic ratio) Hc: 2500 Oe Specific surface area by BET method: 60 m²/g Crystallite size: 125 Å Y; 4.5% by weight/Fe, Al; 3.5% by weight/Fe, Mean length of major axis: 0.07 μm, Mean length of minor axis: 0.013 μm, (Acicular ratio: 5.4) Particle volume: 9290 nm³ σs: 120 emu/g | 100 parts |
| Vinyl chloride based copolymer MR-110 manufactured by Nippon Zeon Co. Ltd. | 12 parts |
| Polyester polyurethane resin Neopentyl glycol/Caprolactonepolyol/ MDI (4,4'-diphenylmethane-diisocyanate) = 0.9/2.6/1 Containing 1 × 10⁻⁴ eq/g of —SO₃Na group | 5 parts |
| α-alumina (particle size of 0.18 μm) | 5 parts |
| Carbon black (particle size of 0.015 μm) | 5 parts |
| Butyl stearate | 1 parts |
| Stearic acid | 2 parts |
| Methyl ethyl ketone | 90 parts |
| Cyclohexanone | 30 parts |
| Toluene | 60 parts |

The above three paints were dispersed respectively using a sand mill after each component was kneaded in a continuous kneader. Polyisocyanate was added to the obtained dispersing liquids; one part was added to the coating liquid for the nonmagnetic layer, and three parts were added to the coating liquids for the uppermost magnetic layer and the lowermost magnetic layer. A mixed solvent of methyl ethyl ketone and cyclohexanone was added by 40 parts to each liquid, and each liquid was filtered using a filter having a mean pore diameter of 1 μm to prepare respective coating liquids for forming the nonmagnetic layer, the uppermost magnetic layer and the lowermost magnetic layer. On a polyethylene naphthalate support having the thickness of 7 μm and the centerline surface roughness (cutoff value of 0.25 mm) of 0.01 μm, the obtained coating liquid for the nonmagnetic layer was coated in such an amount as to form the dry thickness of 1.2 μm, and immediately after this, the coating liquid for the lowermost magnetic layer was coated on the nonmagnetic layer in such an amount as to form the thickness of 0.05 μm, further, the coating liquid for the uppermost magnetic layer was coated on the lowermost magnetic layer in such an amount as to form the thickness of 0.05 μm. These layers were coated by a simultaneous multilayer coating method. While each layer was still in a wet state, the layers were subjected to orientation by a samarium-cobalt magnet having a magnetic force of 3000 G and a solenoid having a magnetic force of 1500 G. After that, the layers were dried and then calendered at the temperature of 90° C. by passing through six nips, each of which constituting only metal rollers, and then slitting it in the width of 8 mm, thereby producing 8 mm video tapes.

Evaluation Method (1) Hc, Br

They were measured by using a vibrating sample magnetometer (manufactured by Toei Kogyo Co.Ltd.) under Hm of 10 kOe.

(2) Electromagnetic characteristics were measured by a drum tester. A recording head used is an MIG head having a Bs of 1.7 T and a gap length of 0.22 μm. A reproducing head used is an MR head containing a magnetoresistive element having a thickness of 20 nm and a shielding gap of 0.2 μm.

The relative speed was 10.5 m/sec for both recording and reproducing. As for the reproduction output and the C/N ratio, a reproducing signal was measured as a noise spectrum with a spectrum analyzer manufactured by Shibasoku Co.Ltdby entering a sine wave at 21 MHz (recording wavelength of 0.5 μm). Then, the output was calculated as a peak voltage at 21 MHz and the C/N ratio was calculated as a ratio of an average value of noise components at 19 MHz and 23 MHz to said peak output at 21 MHz.

TABLE 1

| | | | Ex. 1 | Ex. 2 | Ex. 3 | Ex. 4 | Ex. 5 | Ex. 6 |
|---|---|---|---|---|---|---|---|---|
| Magnetic powder | UML | Kind | Metal | Metal | Metal | Metal | Metal | Metal |
| | | L of major axis [μm] | 0.1 | 0.1 | 0.1 | 0.1 | 0.1 | 0.1 |
| | | L of minor axis [μm] | 0.017 | 0.017 | 0.017 | 0.017 | 0.017 | 0.017 |
| | | V (u) [nm³] | 22700 | 22700 | 22700 | 22700 | 22700 | 22700 |
| | | σs [emu/g] | 150 | 150 | 150 | 150 | 150 | 150 |
| | | Hc [Oe] | 2400 | 2400 | 2400 | 2400 | 2400 | 2400 |
| | LML | Kind | Metal | Metal | Metal | Metal | Metal | BaFe |
| | | L of major axis [μm] | 0.07 | 0.07 | 0.07 | 0.07 | 0.07 | PD 0.03 |

TABLE 1-continued

|  |  |  |  |  |  |  |  |  |
|---|---|---|---|---|---|---|---|---|
|  |  | L of minor axis [μm] | 0.013 | 0.013 | 0.013 | 0.013 | 0.013 | PT 0.01 |
|  |  | V (L) [nm³] | 9290 | 9290 | 9290 | 9290 | 9290 | 5850 |
|  |  | σs [emu/g] | 120 | 120 | 120 | 120 | 120 | 120 |
|  |  | Hc [Oe] | 2500 | 2500 | 2500 | 2500 | 2500 | 2580 |
| Nonmagnetic solid [parts by weight] | UML | VC + Ure + HA | 20 | 20 | 20 | 20 | 20 | 20 |
|  |  | Ab + C | 5.5 | 5.5 | 5.5 | 5.5 | 5.5 | 5.5 |
|  |  | Total amount | 25.5 | 25.5 | 25.5 | 25.5 | 25.5 | 25.5 |
|  | LML | VC + Ure + HA | 20 | 12 | 12 | 12 | 12 | 12 |
|  |  | Ab + C | 5.5 | 0 | 0 | 0 | 0 | 0 |
|  |  | Total amount | 25.5 | 12 | 12 | 12 | 12 | 12 |
| Thickness | [μm] | UML | 0.05 | 0.05 | 0.03 | 0.07 | 0.1 | 0.07 |
|  |  | LML | 0.05 | 0.05 | 0.07 | 0.03 | 0.2 | 0.03 |
|  |  | LNL | 1.2 | 1.2 | 1.2 | 1.2 | 1.2 | 1.2 |
| Magnetization of medium | UML | Hc [Oe] | 2380 | 2380 | 2380 | 2380 | 2380 | 2380 |
|  | LML | Hc [Oe] | 2550 | 2550 | 2550 | 2550 | 2550 | 2680 |
| Evaluation results | Reproduction output | [dB] | 1.5 | 1.7 | 1.2 | 1.5 | 0.7 | 1 |
|  | CNR | [dB] | 3.8 | 5.2 | 5.3 | 4.7 | 3.4 | 5.1 |

|  |  |  |  | Ex. 7 | Ex. 8 | Ex. 9 | Ex. 10 | Ex. 11 |
|---|---|---|---|---|---|---|---|---|
| Magnetic powder | UML | Kind |  | Metal | Metal | Metal | Metal | Metal |
|  |  | L of major axis [μm] |  | 0.1 | 0.1 | 0.1 | 0.09 | 0.1 |
|  |  | L of minor axis [μm] |  | 0.017 | 0.017 | 0.017 | 0.016 | 0.017 |
|  |  | V (u) [nm³] |  | 22700 | 22700 | 22700 | 18100 | 22700 |
|  |  | σs [emu/g] |  | 150 | 150 | 150 | 146 | 135 |
|  |  | Hc [Oe] |  | 2400 | 1800 | 2400 | 2420 | 2360 |
|  | LML | Kind |  | BaFe | Metal | Metal | Metal | Metal |
|  |  | L of major axis [μm] |  | PD 0.03 | 0.07 | 0.07 | 0.06 | 0.07 |
|  |  | L of minor axis [μm] |  | PT 0.01 | 0.013 | 0.013 | 0.012 | 0.013 |
|  |  | V (L) [nm³] |  | 5850 | 9290 | 9290 | 6800 | 9290 |
|  |  | σs [emu/g] |  | 120 | 120 | 120 | 105 | 105 |
|  |  | Hc [Oe] |  | 2580 | 1750 | 2500 | 2480 | 2470 |
| Nonmagnetic solid [parts by weight] | UML | VC + Ure + HA |  | 20 | 20 | 20 | 20 | 20 |
|  |  | Ab + C |  | 5.5 | 5.5 | 5.5 | 5.5 | 5.5 |
|  |  | Total amount |  | 25.5 | 25.5 | 25.5 | 25.5 | 25.5 |
|  | LML | VC + Ure + HA |  | 12 | 12 | 12 | 12 | 12 |
|  |  | Ab + C |  | 0 | 0 | 0 | 0 | 0 |
|  |  | Total amount |  | 12 | 12 | 12 | 12 | 12 |
| Thickness | [μm] | UML |  | 0.04 | 0.05 | 0.02 | 0.05 | 0.05 |
|  |  | LML |  | 0.06 | 0.05 | 0.02 | 0.05 | 0.05 |
|  |  | LNL |  | 1.2 | 1.2 | 1.2 | 1.2 | 1.2 |
| Magnetization of medium | UML | Hc [Oe] |  | 2380 | 1880 | 2380 | 2410 | 2400 |
|  | LML | Hc [Oe] |  | 2680 | 1820 | 2550 | 2510 | 2520 |
| Evaluation results | Reproduction output | [dB] |  | 0.6 | 0.5 | 0.3 | 1.2 | 0.8 |
|  | CNR | [dB] |  | 5.6 | 2.5 | 2.7 | 6.5 | 4.1 |

VC: Vinyl Chloride based copolymer, Ure: Polyester polyurethane resin, HA: Hardening agent, Ab: Abrasive, C: Carbon black, UML: Uppermost magnetic layer, LML: Lowermost magnetic layer, LNM: Lower nonmagnetic layer, L of major axis: Length of major axis, L of minor axis: Length of minor axis, PD: Plate diameter, PT: Plate thickness

TABLE 2

|  |  |  |  | Comp. Ex. 1 | Comp. Ex. 2 | Comp. Ex. 3 | Comp. Ex. 4 |
|---|---|---|---|---|---|---|---|
| Magnetic body | UML | Kind |  | Metal | Metal | Metal | Metal |
|  |  | L of major axis [μm] |  | 0.1 | 0.1 | 0.07 | 0.07 |
|  |  | L of minor axis [μm] |  | 0.017 | 0.017 | 0.013 | 0.013 |
|  |  | V(u) [nm³] |  | 22700 | 22700 | 9290 | 9290 |
|  |  | σs [emu/g] |  | 150 | 150 | 120 | 120 |
|  |  | Hc [Oe] |  | 2400 | 2400 | 2500 | 2500 |

TABLE 2-continued

|  |  |  | Comp. Ex. 1 | Comp. Ex. 2 | Comp. Ex. 3 | Comp. Ex. 4 |
|---|---|---|---|---|---|---|
|  | LML | Kind | — | — | — | Metal |
|  |  | L of major axis [μm] | — | — | — | 0.1 |
|  |  | L of minor axis [μm] | — | — | — | 0.017 |
|  |  | V(L) [nm³] | — | — | — | 22700 |
|  |  | σs [emu/g] | — | — | — | 150 |
|  |  | Hc [Oe] | — | — | — | 2400 |
| Nonmagnetic solid | UML | VC + Ure + HA | 20 | 20 | 20 | 20 |
|  |  | Ab + C | 5.5 | 5.5 | 5.5 | 5.5 |
| [parts by weight] |  | Total amount | 25.5 | 25.5 | 25.5 | 25.5 |
|  | LML | VC + Ure + HA | — | — | — | 12 |
|  |  | Ab + C | — | — | — | 0 |
|  |  | Total amount | — | — | — | 12 |
| Thickness | [μm] | UML | 0.65 | 0.1 | 0.1 | 0.05 |
|  |  | LML | — | — | — | 0.05 |
|  |  | LNL | 1.2 | 1.2 | 1.2 | 2 |
| Magnetization of medium | UML | Hc [Oe] | 2380 | 2380 | 2550 | 2550 |
|  | LML | Hc [Oe] | — | — | — | 2380 |
| Evaluation results | Reproduction output | [dB] | 0 | 1.6 | −1.6 | −0.7 |
|  | CNR | [dB] | 0 | 0.9 | 1.2 | 1.7 |

VC: Vinyl Chloride based copolymer, Ure: Polyester polyurethane resin, HA: Hardening agent, Ab: Abrasive, C: Carbon black, UML: Uppermost magnetic layer, LML: Lowermost magnetic layer, LNM: Lower nonmagnetic layer, L of major axis: Length of major axis, L of minor axis: Length of minor axis.

The sample in which only the uppermost magnetic layer was coated at a thickness of 0.65 μm using the coating liquid composition of the above-mentioned examples was utilized as Comparative Example 1. Examples 1 to 8 and Comparative Examples 2 to 4 were evaluated compared with Comparative Example 1 as a standard of the measurement results.

Example 1 is a representative sample of the present invention. It is characterized in that the total thickness of the magnetic layer is thinner, the output is higher and the CNR is higher because of low noises compared with Comparative Example 1.

Examples 2 to 8 are samples in which the amount of the binder in the lowermost magnetic layer was reduced to 60% with respect to that of Example 1 (wherein the composition ratio is same) as well as alumina and carbon black were not added.

Example 2 to 4 are samples in which the total thickness of the magnetic layer was the same as that of Example 1 while the thickness ratio of the uppermost and lowermost magnetic layers was changed. The good CNR was obtained in all the Examples.

Example 5 is an example in which the total thickness of the magnetic layer was thicker than that of Example 1. The output and CNR were higher than those of Example 1 while the output was reduced because the magnetic layer was thicker than that of Example 2 and the CNR was lowered because of increased noises due to the thick uppermost magnetic layer.

Examples 6 and 7 are examples in which barium ferrite described in Table 1 was used in the lowermost magnetic layer. Although the output was lower than that of Example 4 in which the lowermost magnetic layer contained an alloy powder, the sufficiently high CNR was obtained.

Example 8 is an example in which the Hc of the uppermost layer and the lowermost magnetic layer were equal to or less than 2000 Oe which was lower than that of Example 2. The output and CNR were lower than those of Example 2 but were higher than those of Comparative Example 1.

Example 9 is an example in which the total thickness of the magnetic layer was approximate to the lower limit of the present invention. The output and CNR were lower than those of Example 2 but higher than those of Comparative Example 1.

Example 10 is an example in which a difference between the average particle volume V(u) of the magnetic power in the uppermost magnetic layer and the average particle volume V(L) of the magnetic power in the lowermost magnetic layer was smaller than that of Example 2 as well as the saturation magnetization σs(u) of the magnetic powder in the uppermost magnetic layer and the saturation magnetization σs(L) of the magnetic power in the lowermost magnetic layer were respectively smaller than those of Example 2. Although the output was a little lower than that of Example 2, the CNR was higher than that of Example 2.

Example 11 is an example in which the saturation magnetization σs(u) of the magnetic powder in the uppermost magnetic layer and the saturation magnetization σs(L) of the magnetic powder in the lowermost magnetic layer were respectively smaller than those of Example 2. Both the output and CNR were a little smaller than those of Example 2.

Comparative Example 2 is the same sample as Comparative Example 1 except that the thickness of the magnetic layer was 0.1 μm and is a sample for comparison with Examples 1 and 2. Although the output was approximate to that of Examples 1 and 2, the noise was high and the CNR was low.

Comparative Example 3 is a sample in which the magnetic powder used in the lowermost magnetic layer of Examples 1 and 2 was coated alone in a thickness of 0.1 μm and the output was low.

Comparative Example 4 is a sample in which the magnetic powders in the uppermost and lowermost layers were changed each other and both the output and CNR became lower.

What is claimed is:

1. A magnetic recording medium comprising a flexible nonmagnetic support having thereon, in order, a nonmagnetic layer containing a nonmagnetic powder and a binder and at least two magnetic layers including an uppermost magnetic layer and a lowermost magnetic layer, each containing a ferromagnetic powder and a binder, wherein said at least two magnetic layers have total thickness of from 0.02 µm to 0.5 µm and an average particle volume V(u) and a saturation magnetization σs(u) of a ferromagnetic powder in said uppermost magnetic layer are, respectively, higher than an average particle volume V(L) and a saturation magnetization σs(L) of a ferromagnetic powder in said lowermost magnetic layer, and wherein V(u) is in the range of from 5,000 to 50,000 nm$^3$ and V(L) is in the range of from 1,000 to 20,000 nm$^3$.

2. The magnetic recording medium of claim 1, wherein a thickness d(u) of said uppermost magnetic layer and a thickness d(L) of said lowermost magnetic layer satisfy the following relation; d(u):d(L)=2:8 to 8:2.

3. The magnetic recording medium of claim 2, wherein said thickness d(u) and said thickness d(L) satisfy the following relation; d(u):d(L)=3:7 to 7:3.

4. The magnetic recording medium of claim 1, wherein said uppermost magnetic layer and said lowermost magnetic layer, each, has Hc equal to or higher than 2000 Oe.

5. The magnetic recording medium of claim 1, wherein said ferromagnetic powder contained in said uppermost magnetic layer is an acicular alloy magnetic powder containing Fe as a main component and said ferromagnetic powder contained in said lowermost magnetic layer is an acicular alloy magnetic powder containing Fe as a main component or a magnetoplumbite hexagonal ferrite.

6. The magnetic recording medium of claim 1, wherein said at least two magnetic layers have a total thickness of from 0.04 µm to 0.2 µm.

7. The magnetic recording medium of claim 1, wherein a ratio of said average particle volume V(u) and said average particle volume V(L) is in the range of from 1.5 to 10.

8. The magnetic recording medium of claim 1, wherein said saturation magnetization σs(u) is in the range of from 100 to 160 emu/g and said saturation magnetization σs(L) is in the range of from 50 to 150 emu/g.

9. The magnetic recording medium of claim 8, wherein a subtraction of said σs(L) from said σs(u) is in the range of from 20 to 80 emu/g.

10. The magnetic recording medium of claim 1, wherein said saturation magnetization σs(u) is in the range of from 110 to 155 emu/g and said saturation magnetization σs(L) is in the range of from 55 to 130 emu/g.

11. The magnetic recording medium of claim 1, wherein said uppermost magnetic layer and said lowermost magnetic layer, each, has a coercive force (Hc) from 2,000 to 4,000 Oe.

12. The magnetic recording medium of claim 1, wherein said uppermost magnetic layer has a residual magnetic flux density {Br(u)} from 2,000 to 7,000 G and said lowermost magnetic layer has a residual magnetic flux density {Br(L)} from 1,000 to 5,000 G.

13. The magnetic recording medium of claim 1, wherein said uppermost magnetic layer has a residual magnetic flux density {Br(u)} from 3,000 to 6,000 G and said lowermost magnetic layer has a residual magnetic flux density {Br(L)} from 1,500 to 4,000 G.

14. The magnetic recording medium of claim 1, wherein aid nonmagnetic layer has a thickness from 0.5 to 3 µm.

15. The magnetic recording medium of claim 1, wherein said nonmagnetic powder is selected from titanium oxide, zinc oxide, iron oxide or barium sulfate.

16. The magnetic recording medium of claim 1, wherein a total weight of a nonmagnetic material which is a solid at an ordinary temperature and contained in said uppermost magnetic layer is larger than a total weight of a nonmagnetic material which is a solid at an ordinary temperature and contained in said lowermost magnetic layer.

* * * * *